(No Model.)
W. GABLE & C. H. PELTON.
VELOCIPEDE.
No. 265,056. Patented Sept. 26, 1882.
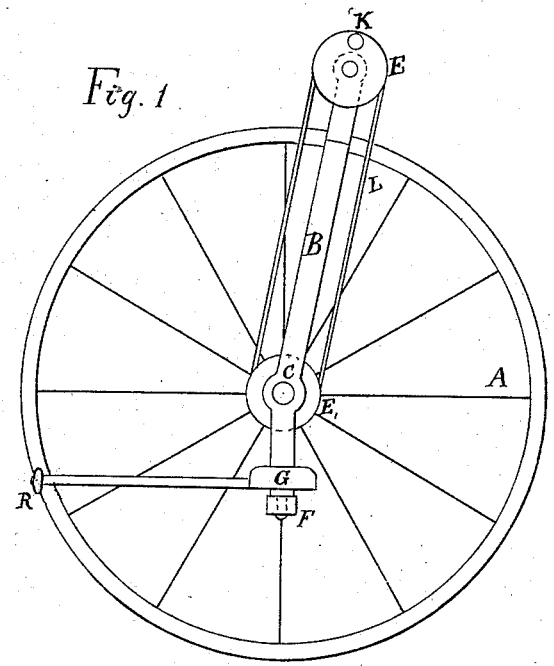
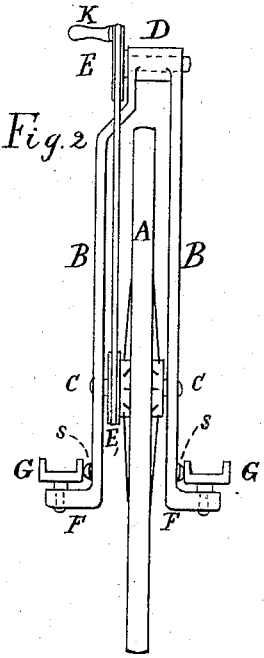
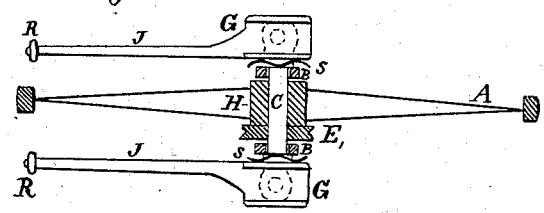
Witnesses
Lewis Windhurst
Selden B. Hoadley
Inventors
William Gable
Charles H. Pelton

UNITED STATES PATENT OFFICE.

WILLIAM GABLE AND CHARLES H. PELTON, OF SPRINGFIELD, OHIO; SAID GABLE ASSIGNOR TO SAID PELTON.

VELOCIPEDE.

SPECIFICATION forming part of Letters Patent No. 265,056, dated September 26, 1882.

Application filed February 9, 1882. (No model.)

*To all whom it may concern:*

Be it known that we, WILLIAM GABLE and CHARLES H. PELTON, both of Springfield, Clarke county, Ohio, have invented a new and useful Improvement in Vehicles, commonly called "Velocipedes," and the species designated by the name of "Monocycle," of which the following is a specification.

The object of our said invention is to produce a velocipede substantially one single wheel, properly called a "monocycle," doing away with the supporting-wheel of the kind called "bicycles." We attain this object by an arrangement illustrated in the accompanying drawings, which are made part hereof, and on which similar letters of reference indicate similar parts, Figure 1 being a vertical side elevation of the apparatus as it appears ready for use; Fig. 2, a front elevation of the same, facing the person riding on it; Fig. 3, a horizontal section of the same through the center of the main wheel.

A represents the main wheel; C, its center; B B, a frame or support going up on each side of the wheel, loosely resting on the center pin of the wheel, and connected at the top by a hollow part, D, and also extending a suitable distance below the center C as far as F F on each side, where the frame bends outward to give support to the stirrups G G, which are pivoted or otherwise suitably fastened to the ends F F of the frame B B, and are of suitable shape to support the feet of the rider.

The person riding on the apparatus will support himself by straddling the main wheel in the usual way, placing his feet in the stirrups and standing in them, and thus throwing his whole weight on them, as on a point below the center C, entirely different from an ordinary velocipede or bicycle, in which the weight of the rider is supported by a seat or saddle above the center C. It appears, therefore, that the weight of the rider being received by G G, it acts as suspended below the center C, thus preventing any otherwise unavoidable tipping over, and consequently doing away with the use of a second wheel for that purpose.

To propel the vehicle or apparatus onward use is made of two pulleys, E E, one of which is placed at the top of the frame, where its shaft rests and turns in the hollow part D of the frame, being turned by the hand of the rider by means of the crank K. The other pulley, E, is firmly connected with the hub H of the wheel A, both pulleys being connected by a belt or chain. It will thus be seen that by the rider standing upright in the stirrups G, facing the frame B and upper pulley, E, taking hold of the upper part of the frame with one hand and turning the crank K with the other, he is able to impart a forward rotary motion to the vehicle, being at the same time himself carried thereby. Furthermore, referring to Fig. 3, parts J J are spurs or extensions of the stirrups backward, either in one piece with them or fixed thereto, and which may terminate in rollers R, which spurs serve to steer the vehicle. All the rider has to do is to let his foot (either on the right or left side, as the case may require) give a twist or turn on the pivot by which the stirrup G is fixed or connected to the support F in the proper direction to make the extremity of J strike against the rim of the wheel A, causing it to deviate from its former course. Between each stirrup G and the frame B is placed a spring, S, (also shown in Fig. 2,) of sufficient strength to turn back the spur J to its proper position as soon as the twist of the foot is relaxed.

Having fully described our invention, what we desire to claim, and secure by Letters Patent, is—

1. In a velocipede, the single wheel supporting the rider at two points, G G, on the frame on each side of the wheel, said two points being below the center in a line parallel to the axis or shaft.

2. In a single-wheel velocipede, a frame having stirrups or points of support G G for sustaining the weight of the rider below the center of the wheel, combined with hand-crank K and suitable mechanism for transmitting the power to the main wheel, substantially as described.

3. The steering apparatus, consisting of the spurs J J and stirrups G G, pivoted to the points of support in such manner as to be pressed against the rim of the wheel by a movement of the foot, as described.

In testimony whereof we have hereunto set our hands this 6th day of February, 1882.

WILLIAM GABLE.
CHARLES H. PELTON.

Witnesses:
LEWIS WINDHURST,
SELDIN B. HOADLEY.